United States Patent
Jin

(10) Patent No.: US 9,287,773 B2
(45) Date of Patent: Mar. 15, 2016

(54) SWITCH POWER SUPPLY CONTROLLER AND CONTROL METHOD

(71) Applicant: Silergy Semiconductor Technology (Hangzhou) LTD, Hangzhou, ZheJiang Province (CN)

(72) Inventor: Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 183 days.

(21) Appl. No.: 14/101,001

(22) Filed: Dec. 9, 2013

(65) Prior Publication Data

US 2014/0159695 A1 Jun. 12, 2014

(30) Foreign Application Priority Data

Dec. 12, 2012 (CN) .......................... 2012 1 0535481

(51) Int. Cl.
*G05F 1/00* (2006.01)
*H02M 3/156* (2006.01)

(52) U.S. Cl.
CPC .................................... *H02M 3/156* (2013.01)

(58) Field of Classification Search
CPC .... H02M 3/156; H02M 3/1588; H02M 3/157
USPC .......................... 323/222, 271, 282–285, 288
See application file for complete search history.

(56) References Cited

U.S. PATENT DOCUMENTS

| | | | |
|---|---|---|---|
| 8,446,746 B2 | 5/2013 | Coulson et al. | |
| 8,471,536 B2 | 6/2013 | Wu et al. | |
| 2007/0257643 A1* | 11/2007 | Chen et al. | ..................... 323/222 |
| 2012/0299561 A1 | 11/2012 | Chen et al. | |
| 2013/0215655 A1 | 8/2013 | Yang et al. | |

* cited by examiner

*Primary Examiner* — Nguyen Tran
(74) *Attorney, Agent, or Firm* — Michael C. Stephens, Jr.

(57) ABSTRACT

In one embodiment, a switch power supply controller can include: (i) a switch configured to operate in first and second states during each switch cycle; (ii) a switch time regulating circuit that compares a duration of the first state in a present switch cycle against an expected first state duration; (iii) the switch time regulating circuit decreasing a duration of the second state in the present switch cycle when the first state duration is greater than the expected first state duration, to decrease a first state duration for a next switch cycle; and (iv) the switch time regulating circuit being increasing the second state duration in the present switch cycle when the first state duration is less than the expected first state duration, to increase a first state duration for a next switch cycle.

7 Claims, 7 Drawing Sheets

SWITCH POWER SUPPLY CONTROLLER AND CONTROL METHOD

RELATED APPLICATIONS

This application claims the benefit of Chinese Patent Application No. 201210535481.7, filed on Dec. 12, 2012, which is incorporated herein by reference in its entirety.

FIELD OF THE INVENTION

The present invention relates to power supplies, and more particularly to a switch power supply controller and a controlling method.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a switch power supply controller can include: (i) a switch configured to operate in a first state and a second state during each switch cycle to convert an input signal to an output signal as part of a switch mode power supply; (ii) a switch time regulating circuit configured to compare a duration of the first state of the switch in a present switch cycle against an expected first state duration; (iii) the switch time regulating circuit being configured to decrease a duration of the second state of the switch in the present switch cycle when the first state duration is greater than the expected first state duration, where a first state duration for a next switch cycle is decreased due to the second state duration of the present cycle being decreased; and (iv) the switch time regulating circuit being configured to increase the second state duration in the present switch cycle when the first state duration is less than the expected first state duration, where a first state duration for a next switch cycle is increased due to the second state duration of the present cycle being increased.

In one embodiment, a method of controlling a switch in a switch power supply can include: (i) comparing a duration of a first state of the switch in a present switch cycle against an expected first state duration of the switch, where the switch operates in the first state and a second state during each switch cycle; (ii) decreasing a duration of the second state of the switch in the present switch cycle when the first state duration is greater than the expected first state duration, where a first state duration for a next switch cycle is decreased due to the second state duration of the present cycle being decreased; and (iii) increasing the second state duration in the present switch cycle when the first state duration is less than the expected first state duration, where a first state duration for a next switch cycle is increased due to the second state duration of the present cycle being increased. Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
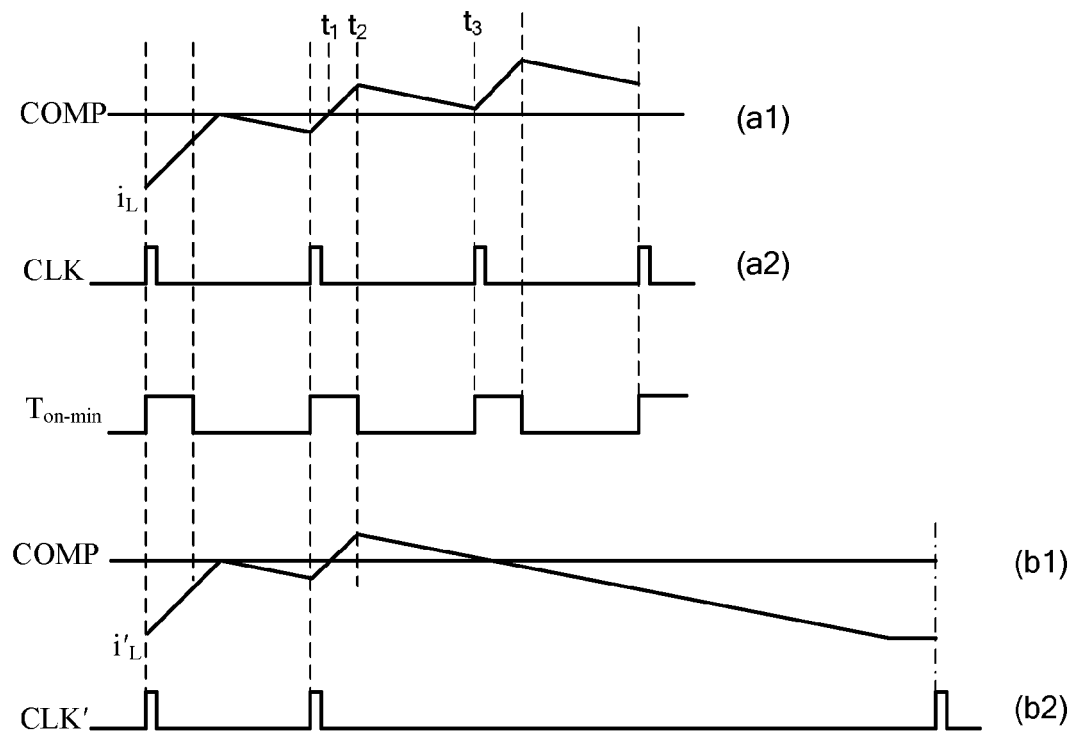
FIG. 1 is a waveform diagram showing example operation of a fixed-frequency control switch power supply.

A common control solution of a switching-mode or "switch" power supply is peak current control mode. In peak current control mode, when the inductance current in the switch power supply rises to a level of feedback error amplification signal COMP of the output voltage, the main switch can be turned. This state can remain until fixed-frequency clock signal CLK arrives to control the main switch to turn on. As shown in FIG. 1, waveforms (a1) and (a2) can represent operating waveforms when the power supply circuit operates under a load short circuit state. In a load short-circuit state, the rising slope of the inductance current may be relatively large, possibly rising to a level of feedback error amplification signal COMP at time $t_1$.

Because of minimum on time $T_{on\text{-}min}$, and the inductance current continuously rising until time $t_2$, the main switch can turn off then to satisfy the condition of the minimum on time. When the main switch is turned off, the slope that the inductance current falls is relatively small, and at time $t_3$, the fixed-frequency clock signal CLK can control the main switch to turn on again. Here, the inductance current may not fall to a level of feedback error amplification signal COMP. Therefore, when the load is short-circuited, the inductance current may remain above feedback error amplification signal COMP, and may have a tendency to rise.

In order to prevent the inductance current from continuously rising, the frequency can be lowered to perform short-circuit protection, as shown in waveforms (b1) and (b2) of FIG. 1. Exponentially reducing the frequency of clock signal CLK to CLK' can ensure that when the inductance current rises too high and when the falling slope of the inductance current is too small, there may still be sufficient time to keep the main switch off, and the inductance current to continuously fall during this time. However, lowering frequency makes the circuit work under discontinuous conductive mode (DCM). When the switch power supply load jumps or undergoes a step change from a short-circuit to a heavy load, the current can begin to rise from a lower starting point, and thus it may trigger the problem of slow start or even being unable to start, which can be especially evident in a current source type of load.

In one embodiment, a switch power supply controller can include: (i) a switch configured to operate in a first state and a second state during each switch cycle to convert an input signal to an output signal as part of a switch mode power supply; (ii) a switch time regulating circuit configured to compare a duration of the first state of the switch in a present switch cycle against an expected first state duration; (iii) the switch time regulating circuit being configured to decrease a duration of the second state of the switch in the present switch cycle when the first state duration is greater than the expected first state duration, where a first state duration for a next switch cycle is decreased due to the second state duration of the present cycle being decreased; and (iv) the switch time regulating circuit being configured to increase the second state duration in the present switch cycle when the first state duration is less than the expected first state duration, where a first state duration for a next switch cycle is increased due to the second state duration of the present cycle being increased.

Figure 2:
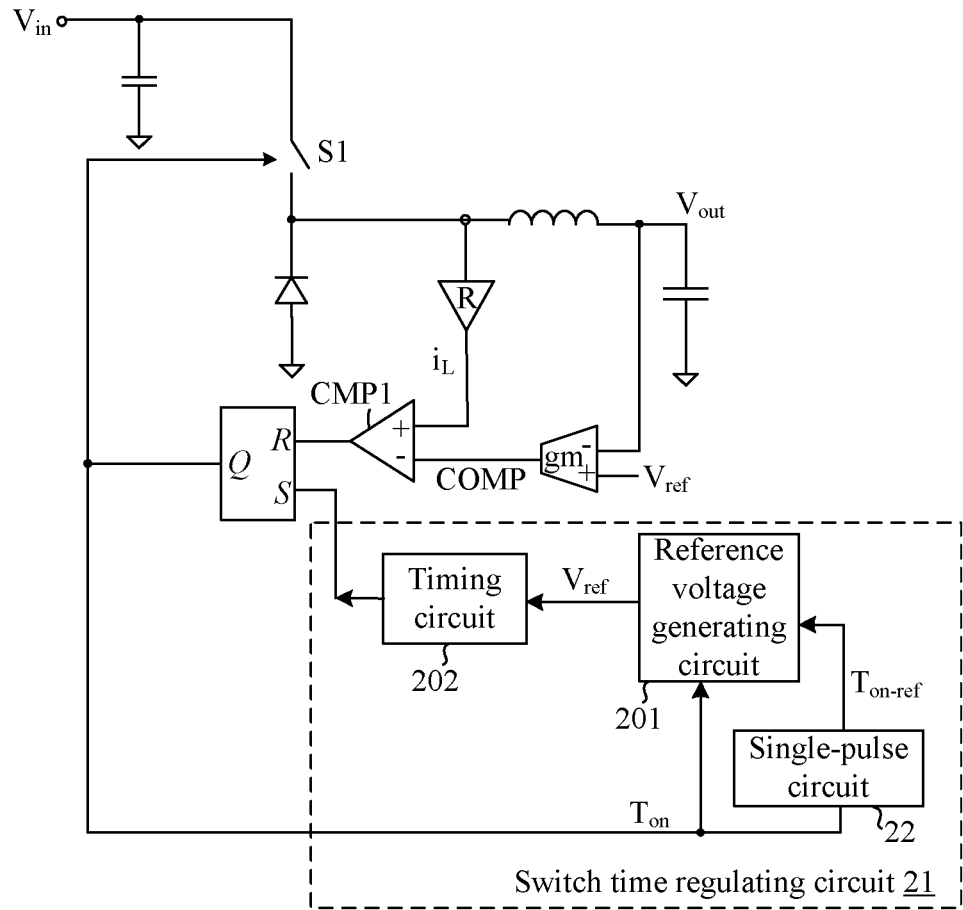
FIG. 2 is a schematic block diagram of a first example switch power supply controller in accordance with embodiments of the present invention.

Referring now to FIG. 2, shown is a schematic block diagram of a first example switch power supply controller in accordance with embodiments of the present invention. In this particular example, the switch power supply controller can be applied in a non-synchronous buck mode DC converter. However, particular embodiments are suitable to any type of power converter (e.g., flyback, boost, SEPIC, buck-boost, etc.). In this case, energy conversion from input voltage $V_{in}$ to output voltage $V_{out}$ can be performed by controlling switch S1 in the power stage circuit to operate under two states of on and off in each switch cycle, so as to supply power to the load at the output voltage.

For example, the DC converter can operate in a peak current control mode, whereby the inductance current is sampled and compared against feedback error amplification signal COMP of the output voltage. When the inductance current $i_L$ rises to a level of feedback error amplification signal COMP, the output signal of comparator CMP1 can control switch S1 to turn off via the RS flip-flop. Switch time regulating circuit 21 can be used to compare the on time $T_{on}$ (the first state duration) against expected first state duration $T_{on-ref}$, and to control the off time of switch S1 according to the comparison result. For example, the comparison result from comparator CMP1 can be used to control switch S1 to turn on again after certain or predetermined time.

When on time $T_{on}$ of switch S1 is greater than expected first state duration $T_{on-ref}$, switch time regulating circuit 21 can reduce the off time for the present switch cycle, such that the on time of the next switch cycle can be reduced. When on time $T_{on}$ of switch S1 is less than expected first state duration $T_{on-ref}$, switch time regulating circuit 21 can increase its off time for the present switch cycle, so that the on time of the next switch cycle is increased. Further, on time $T_{on}$ may be controlled to be approximately a same time or duration as that of expected first state duration $T_{on-ref}$. In this way, second state duration control in a given present switch cycle can be utilized to adjust a first state duration for a next switch cycle.

Figure 3:
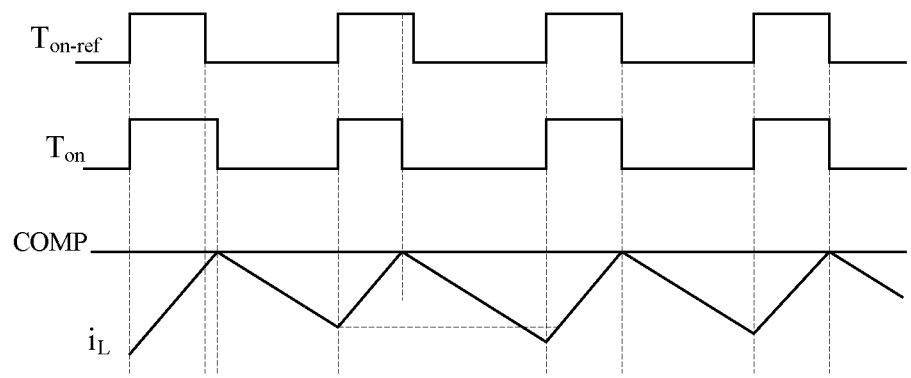
FIG. 3 is a waveform diagram showing example operation of the switch power supply controller of FIG. 2.

Referring now to FIG. 3, shown is a waveform diagram showing example operation of the switch power supply controller of FIG. 2. In this example, when on time $T_{on}$ of switch S1 is greater than expected first state duration $T_{on-ref}$, by reducing the off time of switch S1 for the present switch cycle, inductance current $i_L$ may not be reduced too low (or as much as in a typical cycle) during the off portion of the present switch cycle. Then in the next switch period, switch S1 may be on again, and the inductance current $i_L$ may need less time to rise to a level of feedback error amplification signal COMP, at which point switch S1 may again go off. In this way, on time $T_{on}$ may be reduced as compared with the previous switch cycle.

In addition, when on time $T_{on}$ of switch S1 is less than time $T_{on-ref}$, by extending the off time, inductance current $i_L$ can be reduced to a lower level or state. In the next switch cycle, inductance current $i_L$ may need additional time to rise to a level of feedback error amplification signal COMP, thus increasing on time $T_{on}$. In this way, the on time of switch S1 can be kept at substantially that of the expected first state duration, such that the switch power supply operates in a constant on time mode. Alternatively, the off time can be selected to be controlled in the same manner so that the switch power supply may operate in a constant off time mode. Thus, particular embodiments are suitable for both constant on time and constant off time mode control.

Referring back to FIG. 2, switch time regulating circuit 21 can include reference voltage generating circuit 201 and timing circuit 202. For example, reference voltage generating circuit 201 can provide reference voltage signal $V_{ref}$ according to on time $T_{on}$ and expected first state duration $T_{on-ref}$. The signal indicating the on time may be configured as the control signal of switch S1, with an active high on state of switch S1. For example, switch S1 can be a transistor. Also, the signal indicating expected first state duration $T_{on-ref}$ can be generated based on control of switch S1 by single-pulse circuit 22. For example, single-pulse circuit 22 may output a pulse signal having a same pulse width as that of expected first state duration $T_{on-ref}$ at the on time of switch S1.

Timing circuit 22 can time the off time, to control the off time of switch S1 to substantially match reference voltage signal $V_{ref}$. In other words, when reference voltage signal $V_{ref}$ becomes higher or lower with the change of on time $T_{on}$, the off time of switch S1 can be adaptively adjusted. Thus in particular embodiments, the switch power supply controller can set an expected first state duration of the switch state (e.g., the on state), and adjust the time of the inverse state (e.g., the off state) in real time based on a comparison of the expected first state duration against the actual switch time or state duration. Therefore, when the switch power supply load is short-circuited, instead of preventing current overshoot by reducing the switch frequency, the operating frequency can be intelligently adjusted according to the actual conditions of each switch cycle. In this way, potential problems of being unable to start because the inductance current is reduced too low can be avoided.

Figure 4:
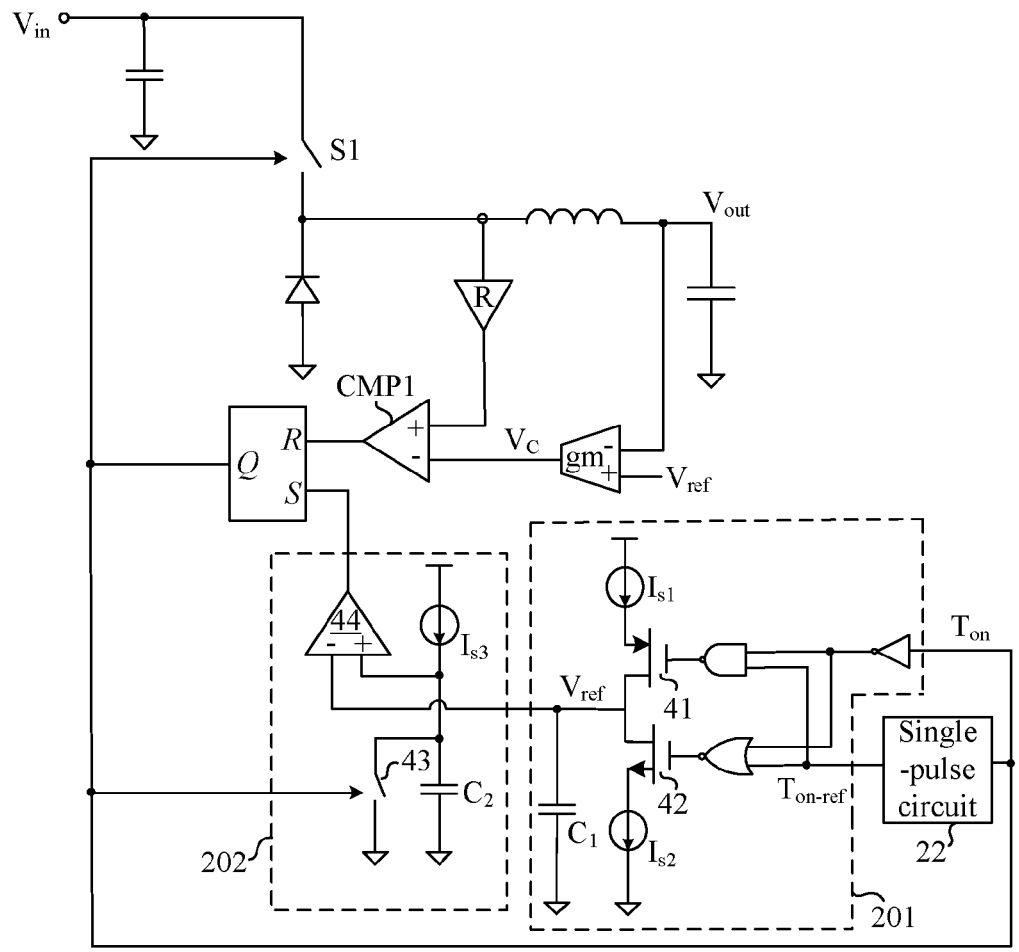
FIG. 4 is a schematic block diagram of a second example switch power supply controller in accordance with embodiments of the present invention.

Referring now to FIG. 4, shown is a schematic block diagram of a second example switch power supply controller in accordance with embodiments of the present invention. This particular example shows exemplary details of reference voltage generating circuit 201 and timing circuit 202. Reference voltage generating circuit 201 can include a charging and discharging control circuit, and capacitor $C_1$. For example, a voltage across capacitor $C_1$ can be configured as reference voltage signal $V_{ref}$.

The charging and discharging control circuit can include current source $I_{S1}$, switch 41, switch 42, current source $I_{S2}$, and a logic circuit including a NAND-gate a NOR-gate, and an inverter, as shown. The charging and discharging control circuit can receive signal $T_{on}$ denoting the on time and signal $T_{on-ref}$ denoting the expected first state duration. For example, signal $T_{on}$ can be provided to the NAND-gate and the NOR-gate after being inverted. The NAND-gate and the NOR-gate can also receive signal $T_{on-ref}$ as shown. When switch S1 is turned on, signal $T_{on}$ and signal $T_{on-ref}$ may both be high, and the NAND-gate output can also be high. Switch 41 (e.g., a PMOS transistor) can be off, and the NOR-gate output can be low. Switch 42 (e.g., a NMOS transistor) may also be off, and the voltage (e.g., reference voltage signal $V_{ref}$) at capacitor $C_1$ can remain substantially unchanged. Of course, other logic gates and/or circuit structures can also be employed in particular embodiments to implement reference voltage generating circuit 201.

When the on time of switch S1 is less than the expected first state duration (e.g., when signal $T_{on-ref}$ is high while signal $T_{on}$ is low), the NAND-gate and the NOR-gate can each output a low level. Thus, switch 41 can be turned on, and switch 42 can be turned off. At this time, current source $I_{S1}$ may start to charge capacitor $C_1$, and reference voltage signal $V_{ref}$ can begin to rise. When the on time of switch S1 is longer or greater than the expected first state duration (e.g., when signal $T_{on}$ is high while signal $T_{on-ref}$ is low), the NAND-gate and the NOR-gate can each output a high level. Thus, switch 41 can be turned off and switch 42 can be turned on. In this case, capacitor $C_1$ can discharge by current source $I_{S2}$, and reference voltage signal $V_{ref}$ may begin to decrease.

Timing circuit 202 can include a ramp signal generating circuit and a comparison circuit. For example, the ramp signal generating circuit can include current source $I_{S3}$, capacitor $C_2$, and switch 43. For example, the action of switch 43 may be kept consistent with that of switch S1. When switch S1 is off, switch 43 may also be turned off to control current source $I_{S3}$ to charge capacitor $C_2$. In this way, the voltage of capacitor $C_2$ can be a ramp signal with certain or predetermined slope.

The comparison circuit can be realized by comparator 44, and its in-phase input can receive the ramp signal, and its inverted input can receive reference voltage signal $V_{ref}$. When the ramp signal rises to a level of reference voltage signal $V_{ref}$, the output of comparator 44 can control switch S1 to turn on again via the RS flip-flop. Thus, when the on time of switch S1 is less than the expected first state duration, the greater the difference value between the on and expected on times of switch S1, and the higher the corresponding reference voltage signal $V_{ref}$. Thus, the rising time of the ramp signal can correspondingly be extended such that the off time of switch S1 can be extended. In contrast, when the on time of switch S1 is greater than the expected first state duration, the value of reference voltage signal $V_{ref}$ can be reduced such that the off time of switch S1 is also reduced.

Figure 5:
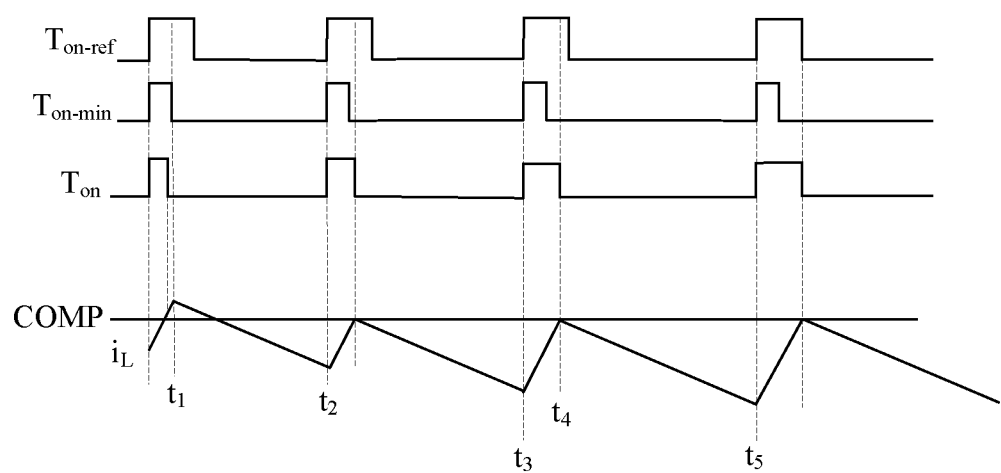
FIG. 5 is a waveform diagram showing a first example operation of the switch power supply controller of FIG. 4.

Referring now to FIG. 5, shown is a waveform diagram showing a first example operation of the switch power supply controller of FIG. 4. In this example, the DC converter of FIG. 4 may enter into a load short-circuit protection state. When load short-circuit occurs, the on time of switch S1 may be relatively short. Also, the rising slope of inductance current $i_L$ can be relatively high, with a low or more gradual falling slope. Thus, inductance current $i_L$ may need to rise continuously to satisfy the minimum on time, until switch S1 is turned off at time $t_1$. At this time, due to operation of the switch time regulating circuit, as discussed above, the off time of switch S1 can be adaptively extended.

Due to the extension of the off time, inductance current $i_L$ may fall to a lower value. Thus, from time $t_2$, switch S1 can be turned on, and the time taken for inductance current $i_L$ to rise to a level of feedback error amplification COMP can also be correspondingly extended. In this fashion, time $T_{on}$ can be extended as compared with the previous switch cycle. This cycle to cycle timing adjustment can be repeated, and on time $T_{on}$ can become closer to expected first state duration $T_{on-ref}$. Finally, from time $t_5$, on time $T_{on}$ can be equal to expected first state duration $T_{on-ref}$, and the DC converter may enter into a load short-circuit protection state with stable operation. During this process, inductance current $i_L$ can fall but not to zero, and thus the inductance current may remain in a continuous conductive mode (CCM).

Figure 6:
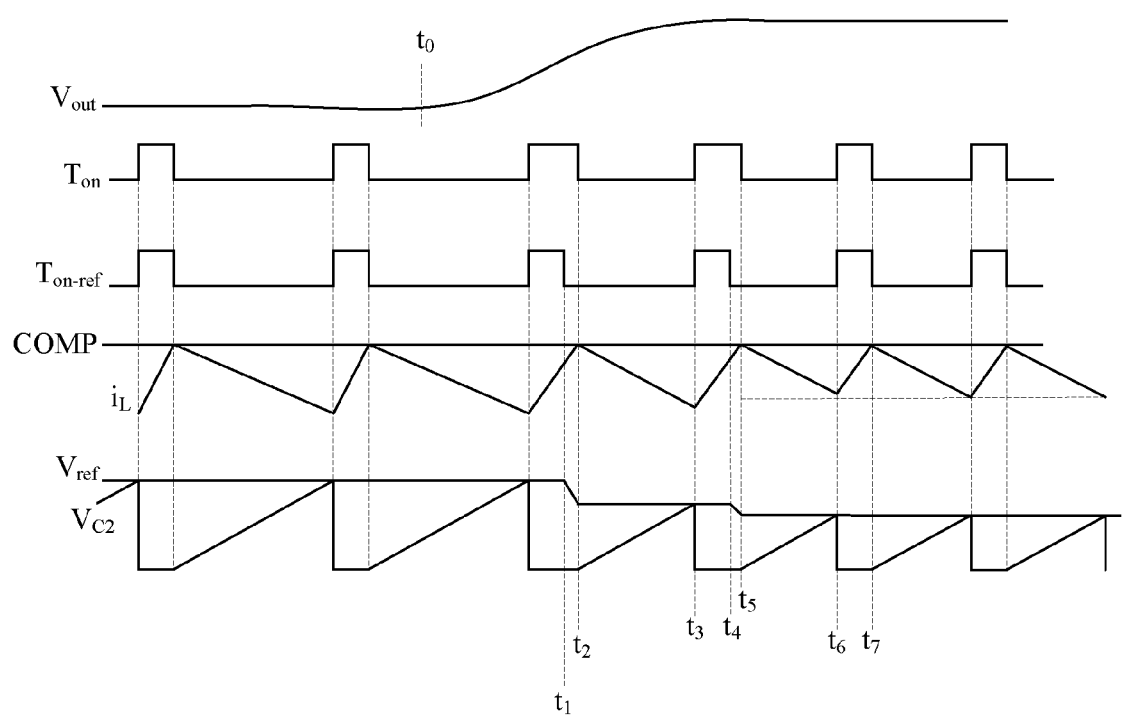
FIG. 6 is a waveform diagram showing a second example operation of the switch power supply controller of FIG. 4.

Referring now to FIG. 6, shown is a waveform diagram of a second example operation of the switch power supply controller of FIG. 4. In this example, the load short-circuit protection can enter into a heavy load start state. At time $t_o$, the DC converter may enter into a heavy load state, and its output voltage $V_{out}$ can abruptly increase. Also, the rising slope of inductance current $i_L$ can be reduced as compared with the previous cycles, and the falling slope of inductance current $i_L$ can be increased. At time $t_2$, since the on time $T_{on}$ of the heavy load state is greater than the expected first state duration $T_{on-ref}$, capacitor $C_1$ can discharge, and reference voltage signal $V_{ref}$ may fall to time $t_2$ when switch S1 is turned off.

Due to the falling of reference voltage signal $V_{ref}$, the time that it takes for capacitance voltage $V_{C2}$ to rise to a level of reference voltage signal $V_{ref}$ can be reduced, such that the off time (and the off time from time $t_2$ to $t_3$) may also be reduced. For the same reason, from time $t_4$ to $t_5$, reference voltage signal $V_{ref}$ can be further reduced, and finally from time $t_6$, on time $T_{on}$ may be equal to expected on time $T_{on-ref}$. Thus, the DC converter can enter into a heavy load state with stable operation.

Thus in particular embodiments, an expected first state duration of the switch state can be set, and a second state duration can be adjusted in real time according to a comparison between the expected first state duration and actual switch time state. This can also ensure that the switch power supply operates in a constant on time mode or a constant off time mode in normal operation. In addition, during short circuit protection of the power supply load, because the switch on time can be reduced as compared with the expected first state duration, extending the off time can ensure the inductance current does not overshoot. Further, when jumping or abruptly changing from the heavy load start, the off time can be again reduced to ensure that the inductance current is kept at the CCM, rather than an interrupted on mode, for a successful and fast start of the switch power supply.

In the particular examples shown in FIGS. 2 and 4, the on state of the switch can be defined as the first state, and correspondingly its off state made be defined as the second state. However, various state definitions and/or controls can be supported in particular embodiments. For example, in a switch power supply controlled by constant off time, the off state of the switch may be defined as the first state, and the on state can be defined the second state. In this case the off time of the switch may be controlled as being consistent with the expected first state duration. In addition, particular embodiments are suitable for any type of power converter, and are not limited to the exemplified buck-type DC converter.

In one embodiment, a method of controlling a switch in a switch power supply can include: (i) comparing a duration of a first state of the switch in a present switch cycle against an expected first state duration of the switch, where the switch operates in the first state and a second state during each switch cycle; (ii) decreasing a duration of the second state of the switch in the present switch cycle when the first state duration is greater than the expected first state duration, where a first state duration for a next switch cycle is decreased due to the second state duration of the present cycle being decreased; and (iii) increasing the second state duration in the present switch cycle when the first state duration is less than the expected first state duration, where a first state duration for a next switch cycle is increased due to the second state duration of the present cycle being increased.

Figure 7:
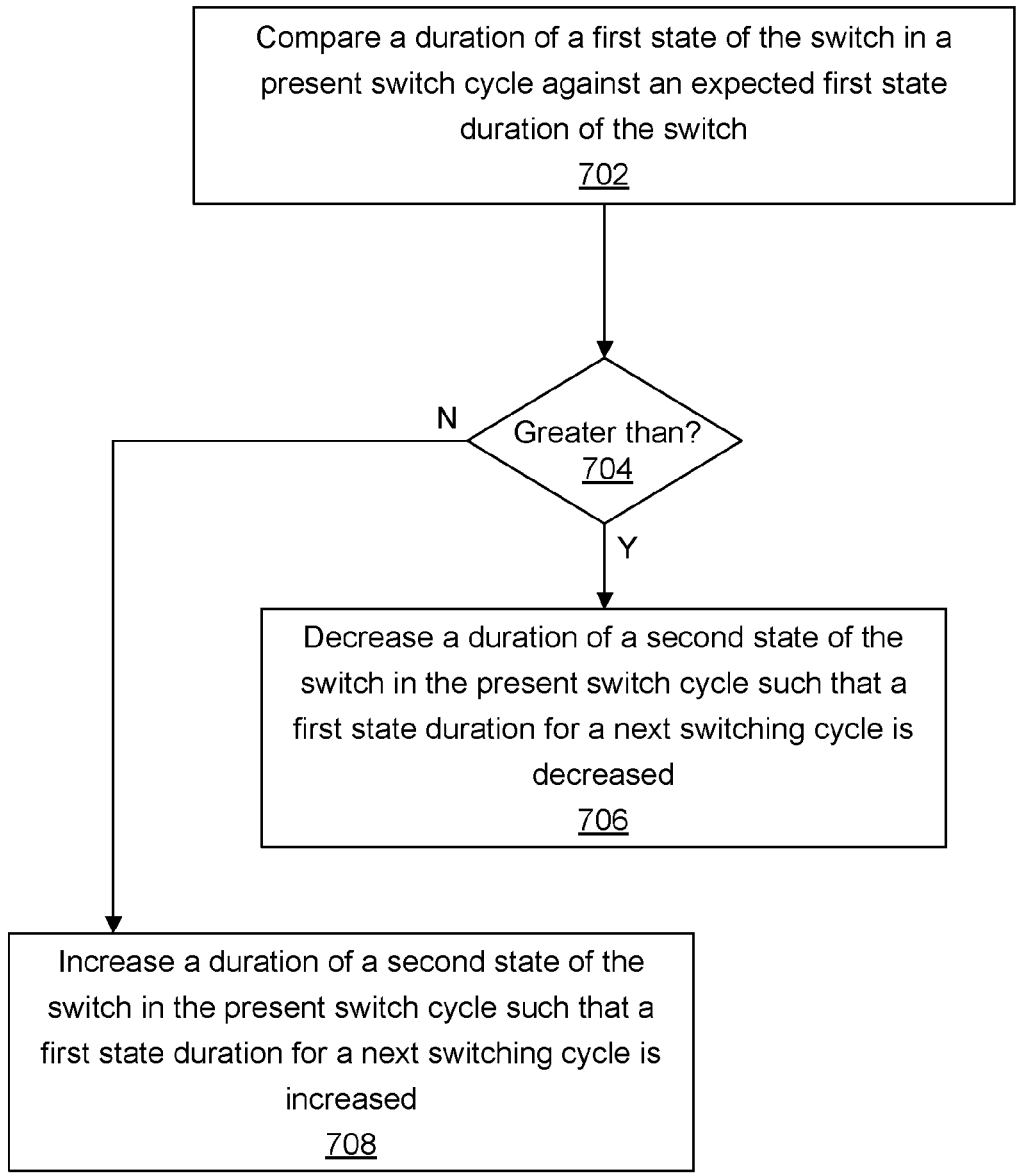
FIG. 7 is a flow diagram showing example control of a switch in a switch power supply, in accordance with embodiments of the present invention.

Referring now to FIG. 7, shown is a flow diagram of example control of a switch in a switch power supply, in accordance with embodiments of the present invention. At 701, the duration of a first state of the switch in a present switch cycle can be compared against an expected first state duration of the switch. For example, $T_{on}$ can be compared against $T_{on-ref}$, such as by using switch time regulating circuit 21. The switch (e.g., S1) in the switch power supply can operate in the first (e.g., on) state and a second (e.g., off) state during each switch cycle.

If the first state duration is greater than the expected first state duration at 704, the duration of the second state of the switch can be decreased in the present switch cycle at 706. A first state duration for a next switch cycle can be decreased due to the second state duration of the present cycle being decreased. For example, the inductance current can discharge to a level higher than a previous cycle level such that inductance current $i_L$ can reach a level of feedback error amplification signal COMP to end the on state of the next switch cycle earlier.

If the first state duration is less than the expected first state duration at 704, the duration of the second state of the switch can be increased in the present switch cycle at 708. The first state duration for the next switch cycle can be increased due to the second state duration of the present cycle being increased. For example, the inductance current can discharge to a level lower than a previous cycle level such that inductance current $i_L$ may take longer to reach a level of feedback error amplification signal COMP to end the on state of the next switch cycle.

In particular embodiments, the switch power supply can operate in a peak current control mode. In comparing the first state duration against the expected first state duration, a reference voltage signal based on the first state duration and the expected first state duration can be obtained. The second state duration can be controlled to substantially match that of the reference voltage signal. For example, to obtain a reference voltage signal, a signal indicating the first state and the expected first state durations can be received. Depending on whether the first state duration is greater than or less than the expected first state duration, a capacitor can be charged or discharged based on the difference between the first state duration and the expected first state duration. For example, a voltage across the capacitor (e.g., $C_1$) can be configured as the reference voltage signal.

In order to control the second (e.g., off) state duration to substantially match that of the reference voltage signal, a ramp signal with a certain or predetermined slope can be output at the start time of the second state. For example, in response to the transition of switch S1 from on to off, the ramp signal can be output. The ramp signal can be compared against the reference voltage signal, and the second state can be ended when the ramp signal rises to a level of the reference voltage signal. In this way, the duration of the second or off state in a present switching cycle can be controlled.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A switch power supply controller, comprising:
   a) a switch configured to operate in a first state and a second state during each switch cycle to convert an input signal to an output signal as part of a switch mode power supply;
   b) a switch time regulating circuit configured to compare a duration of said first state of said switch in a present switch cycle against an expected first state duration;
   c) said switch time regulating circuit being configured to decrease a duration of said second state of said switch in said present switch cycle when said first state duration is greater than said expected first state duration, wherein a first state duration for a next switch cycle is decreased due to said second state duration of said present switch cycle being decreased;
   d) said switch time regulating circuit being configured to increase said second state duration in said present switch cycle when said first state duration is less than said expected first state duration, wherein a first state duration for said next switch cycle is increased due to said second state duration of said present switch cycle being increased;
   e) said switch time regulating circuit comprising a reference voltage generating circuit configured to output a reference voltage signal based on said first state duration and said expected first state duration, and a timing circuit configured to control said second state duration to substantially match said reference voltage signal; and
   f) said timing circuit comprising a ramp signal generating circuit configured to output a ramp signal at a start time of said second state of said switch, and a comparison circuit configured to compare said ramp signal against said reference voltage signal, and to output a signal to end said second state of said switch when said ramp signal rises to a level of said reference voltage signal.

2. The switch power supply controller of claim 1, wherein said switch time regulating circuit is configured to operate in a peak current control mode.

3. The switch power supply controller of claim 1, wherein said reference voltage generating circuit comprises:
   a) a charging and discharging circuit configured to receive a signal that indicates said first state duration and said expected first state duration;
   b) a first capacitor configured to be discharged by said charging and discharging circuit when said first state duration is greater than said expected first state duration;
   c) said first capacitor being configured to be charged by said charging and discharging circuit when said first state duration is less than said expected first state duration; and
   d) wherein said first capacitor is charged and discharged according to a difference between said first state duration and said expected first state duration, and wherein said first capacitance voltage is configured as said reference voltage signal.

4. A method of controlling a switch in a switch power supply, the method comprising:
   a) comparing a duration of a first state of said switch in a present switch cycle against an expected first state duration of said switch, wherein said switch operates in said first state and a second state during each switch cycle;
b) decreasing a duration of said second state of said switch in said present switch cycle when said first state duration is greater than said expected first state duration, wherein a first state duration for a next switch cycle is decreased due to said second state duration of said present switch cycle being decreased;
c) increasing said second state duration in said present switch cycle when said first state duration is less than said expected first state duration, wherein a first state duration for said next switch cycle is increased due to said second state duration of said present switch cycle being increased;
d) providing a ramp signal at a start time of said second state of said switch; and
e) comparing said ramp signal against said reference voltage signal, and providing a signal to end said second state of said switch when said ramp signal rises to a level of said reference voltage signal.

5. The method of claim 4, wherein said switch power supply operates in a peak current control mode.

6. The method of claim 4, further comprising:
a) receiving a reference voltage signal based on said first state duration and said expected first state duration; and
b) controlling said second state duration to substantially match said reference voltage signal.

7. The method of claim 6, further comprising:
a) receiving a signal indicating said first state duration and said expected first state duration;
b) discharging a first capacitor when said first state duration is greater than said first expected first state duration;
c) charging said first capacitor when said first state duration is less than said expected first state duration; and
d) wherein said charging and discharging is performed according to a difference between said first state duration and said expected first state duration, and wherein said first capacitance voltage is configured as said reference voltage signal.

* * * * *